UNITED STATES PATENT OFFICE.

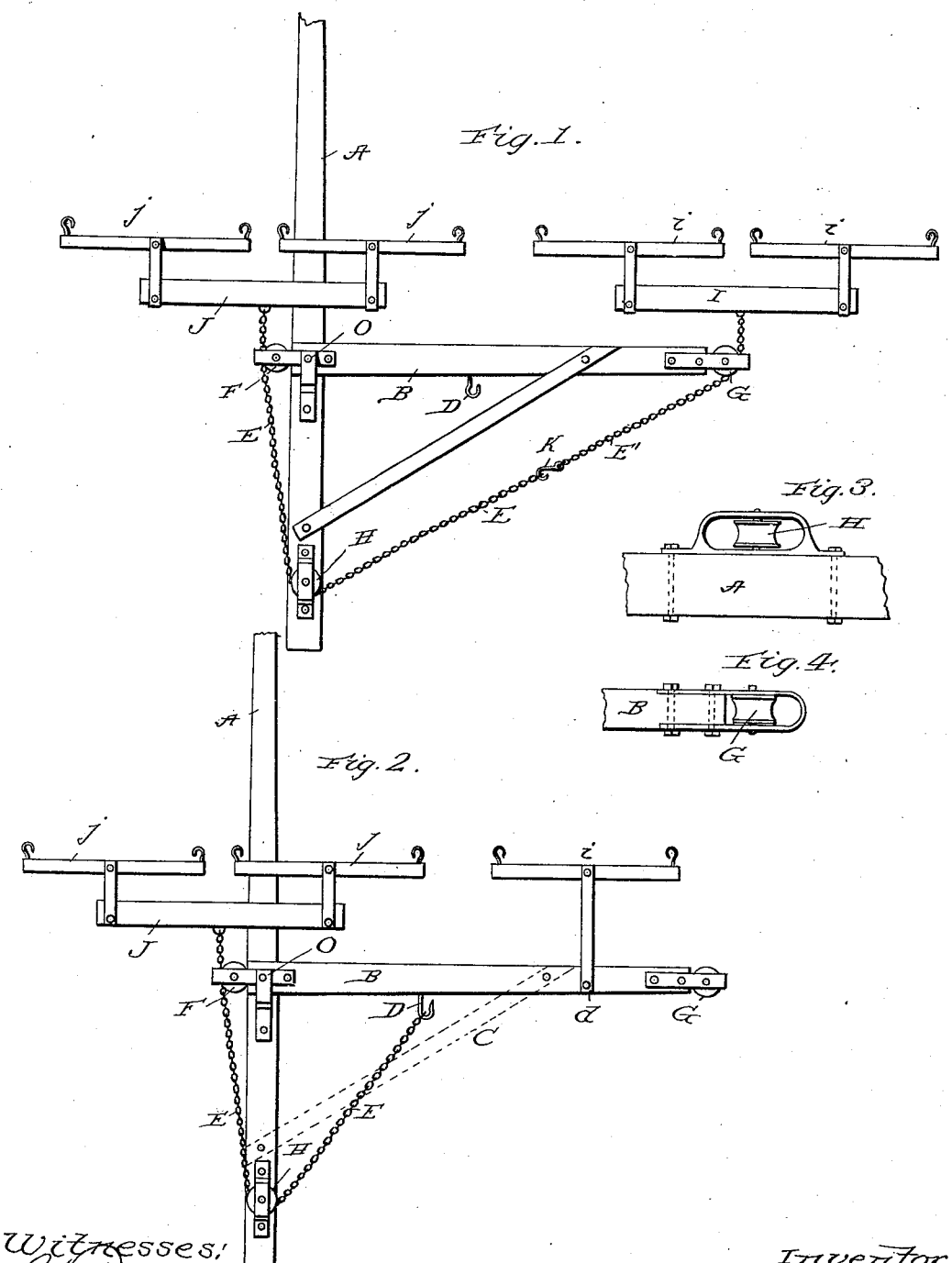

MICHAEL McDUNN, OF BARNESVILLE, MINNESOTA.

DRAFT-EQUALIZER.

SPECIFICATION forming part of Letters Patent No. 507,632, dated October 31, 1893.

Application filed June 7, 1892. Serial No. 435,914. (No model.)

*To all whom it may concern:*

Be it known that I, MICHAEL MCDUNN, a citizen of the United States, residing at the city of Barnesville, in the county of Clay and State of Minnesota, have invented certain new and useful Improvements in a Combined Three and Four Horse Draft-Equalizer, of which the following is a specification.

The object of this invention is to provide a combined three and four horse draft-equalizer adapted especially for use on self binding harvesters or any machine, where it is desirable to use either three or four horses; one on one side of the pole next to the grain, and either two or three on the other; and avoiding at the same time as far as possible all side draft.

My invention consists in the peculiar construction and arrangement substantially as hereinafter more fully described and pointed out in the claim.

In the accompanying drawings Figure 1. represents in plan view my invention arranged for four horses. Fig. 2. represents my invention in plan view arranged for three horses. Fig. 3. is a detailed view of the center pulley "H." which is attached to the pole. Fig. 4. is a detailed view of one of the pulleys "F." and "G." attached to the cross bar "B."

The same letters refer to like parts in all the views.

Attached to the pole "A." is the evener or cross bar "B." At each end of the cross bar "B" is a pulley attached as shown in Fig. 4. On the pole "A" in the rear of the cross bar "B" is secured the pulley "H" attached as shown in Fig. 3.

When used as a four horse equalizer, the cross bar "B" extending to the right of the pole is supported in one position by the brace "C" as shown in Fig. 1. In practice I prefer to have the brace "C" bolted on top of the tongue "A" and the cross bar "B," but it may be a strut rod or any brace that will secure the desired result. Attached to the double trees "J" and "I" are the chains "E" and "E'" passing around the pulleys "F," "H," and "G" and connected by the hook "K" or any suitable fastening. The pulley "F" is so situated that while the doubletree "J" is astride the pole "A" it is thrown slightly to the left for the purpose of overcoming side draft. Attached to the double trees "J" and "I" are the single trees "j" "j" and "i" "i." It will be seen that one of the single trees "j" is upon the left of the pole "A" and the other single tree "j" and the single trees "i" "i" are upon the right of the pole.

When used as a three horse draft-equalizer, as shown in Fig. 2., the brace "C" is detached, leaving the cross bar or evener "B" pivoted at "O." The chains "E" and "E'" are disconnected at "K," the chain "E" being passed around the pulleys "F" and "H" and attached to the hook "D" or any suitable fastening midway between "O" and "d" on the cross bar or evener "B;" and the double tree "I" and the chain "E'" being removed. The single tree "i" is attached to the cross bar or evener "B" at "d" in any suitable manner.

I am aware that prior to my invention chains and pulleys have been used in draft-equalizers; I therefore do not claim such a combination broadly; but What I do claim as my invention, and desire to secure by Letters Patent, is—

The interchangeable four and three horse draft equalizer described, comprising the pole A, the pulley H, journaled thereon, the cross bar B, having pulleys at opposite ends thereof, and also having the hook D, and secured at one end to the pole as shown, the whiffle-trees, and the chain passing over the respective pulleys, and connected to the whiffle-trees, and the brace, detachably connecting the cross bar with the pole, all adapted to operate, substantially as specified.

In testimony whereof I affix my signature hereto, in the presence of two witnesses, this 2d day of June, 1892.

MICHAEL McDUNN.

Witnesses:
CHAS. S. MARDEN,
RICHARD G. TWEETON.